(12) United States Patent
Rostron et al.

(10) Patent No.: US 11,223,196 B2
(45) Date of Patent: Jan. 11, 2022

(54) FAULT-PREVENTING CIRCUIT RECLOSER

(71) Applicant: Southern States, LLC, Hampton, GA (US)

(72) Inventors: Joseph R Rostron, Hampton, GA (US); Jiyuan Fan, Hampton, GA (US); Teng Hu, Hampton, GA (US)

(73) Assignee: Southern States, LLC, Hampton, GA (US)

( * ) Notice: Subject to any disclaimer, the term of this patent is extended or adjusted under 35 U.S.C. 154(b) by 297 days.

(21) Appl. No.: 16/249,683

(22) Filed: Jan. 16, 2019

(65) Prior Publication Data
US 2019/0229523 A1 Jul. 25, 2019

Related U.S. Application Data

(60) Provisional application No. 62/619,706, filed on Jan. 19, 2018.

(51) Int. Cl.
*H02H 9/00* (2006.01)
*H02H 7/26* (2006.01)
*H02H 1/00* (2006.01)

(52) U.S. Cl.
CPC ............ *H02H 7/26* (2013.01); *H02H 1/0007* (2013.01)

(58) Field of Classification Search
CPC .............................. H02H 7/26; H02H 1/0007
USPC ...................................................... 361/58, 61
See application file for complete search history.

(56) References Cited

U.S. PATENT DOCUMENTS

| | | | | |
|---|---|---|---|---|
| 3,543,047 A | * | 11/1970 | Renfrew | .................. H01H 9/54 361/3 |
| 4,831,487 A | * | 5/1989 | Ruoss | .................. H01H 33/161 361/111 |
| 5,303,112 A | * | 4/1994 | Zulaski | .................. H02H 7/261 361/67 |
| 5,388,021 A | * | 2/1995 | Stahl | ...................... H02H 9/005 361/104 |

* cited by examiner

*Primary Examiner* — Jared Fureman
*Assistant Examiner* — Lucy M Thomas
(74) *Attorney, Agent, or Firm* — Mehrman Law Office; Michael J. Mehrman

(57) ABSTRACT

A fault-preventing circuit recloser includes a ballast impedance, power line current and voltage monitors, and controller that operates the switch based on measurements obtained from the current and voltage monitors. The controller aborts the closing (i.e., reopens the switch) when the controller detects that the switch has closed into faulted line. The circuit recloser temporarily introduces the ballast impedance into the circuit during the closing operation to limit the current spike and voltage dip caused by initially closing the switch into the faulted line. The circuit recloser also temporarily introduces the ballast impedance into the circuit during the opening operation to limit the voltage transient that can be caused by initially opening a load-carrying power line. Different ballast resistor insertion times are applied depending on the type of recloser operation (opening or closing) and whether a fault is detected.

20 Claims, 12 Drawing Sheets

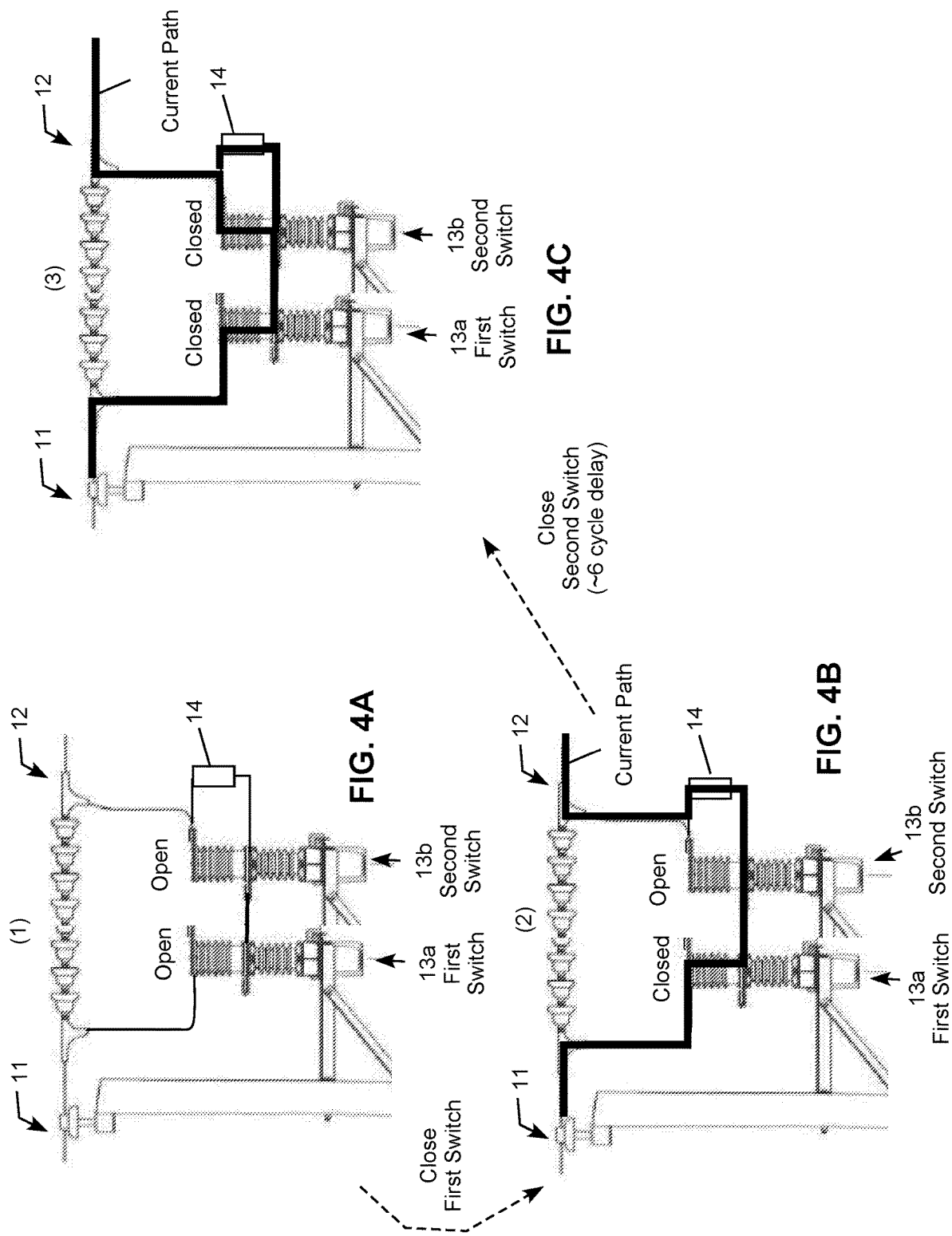

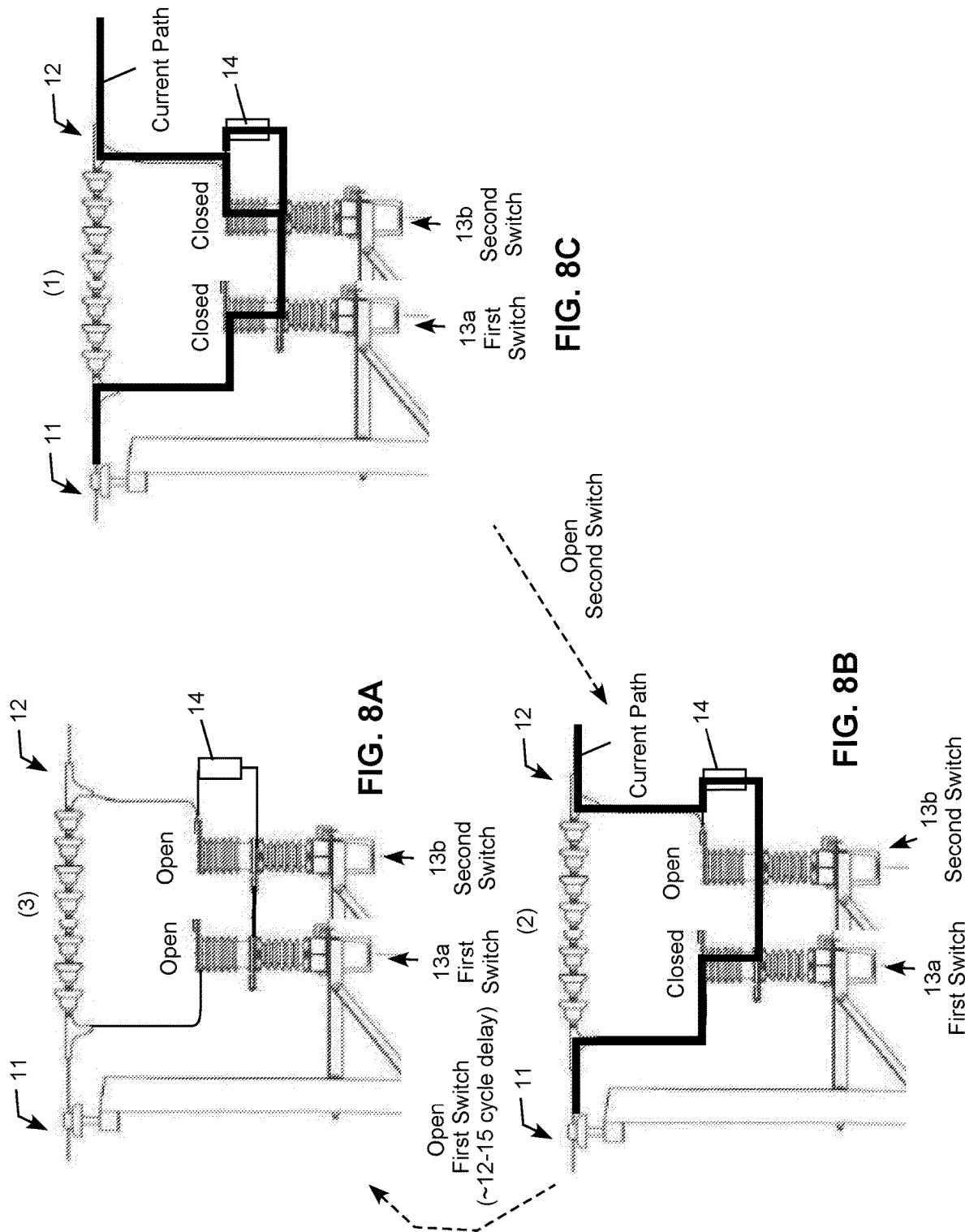

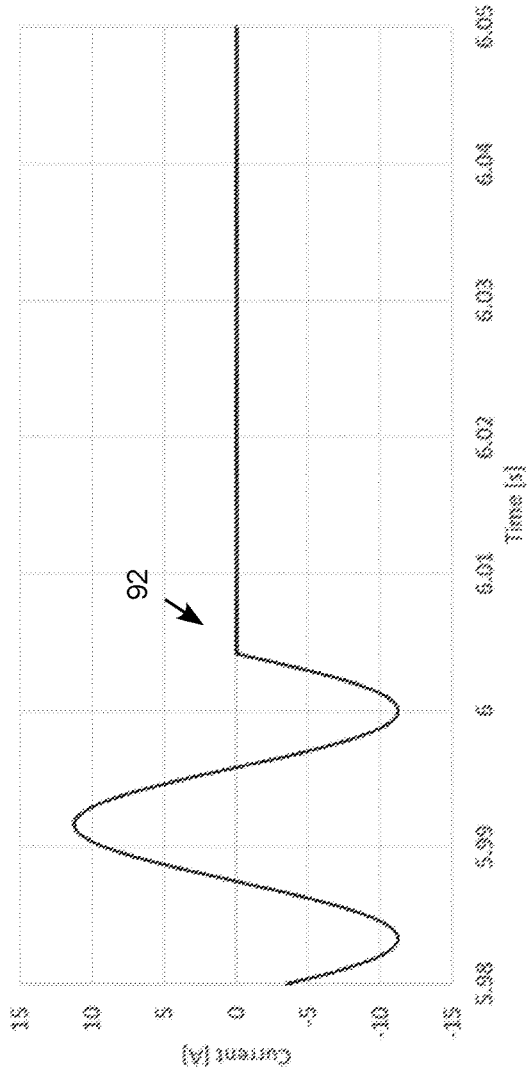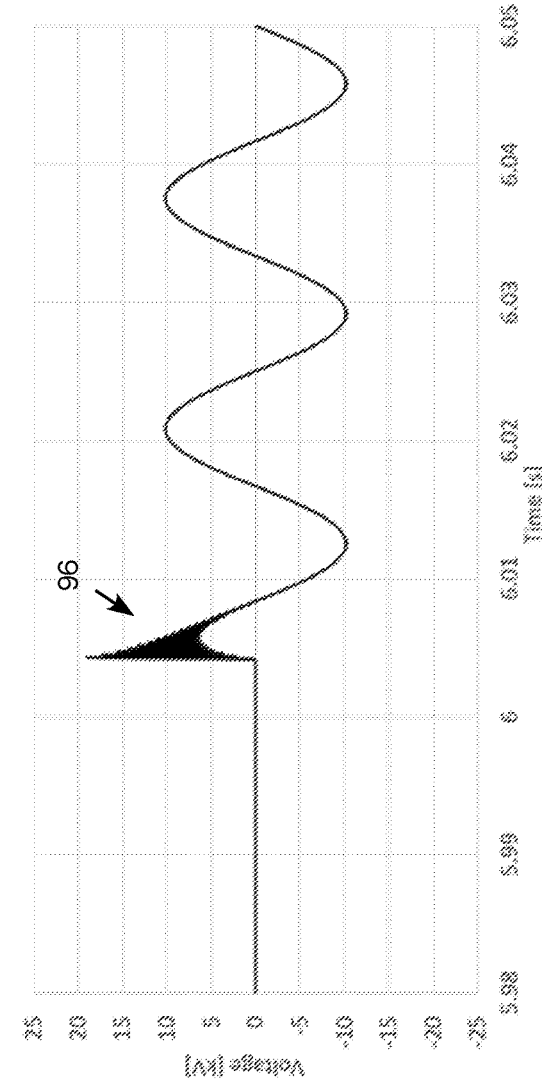

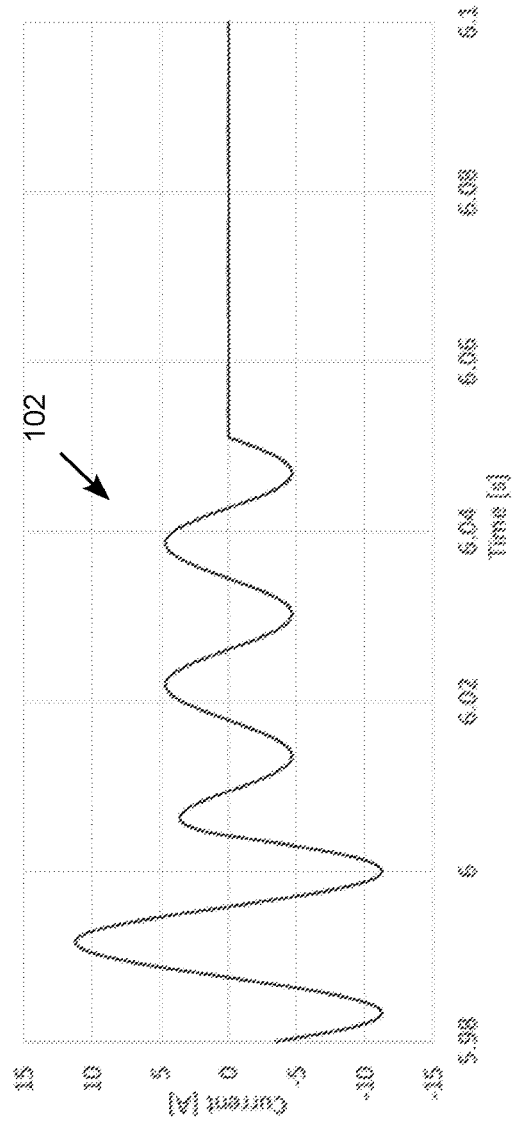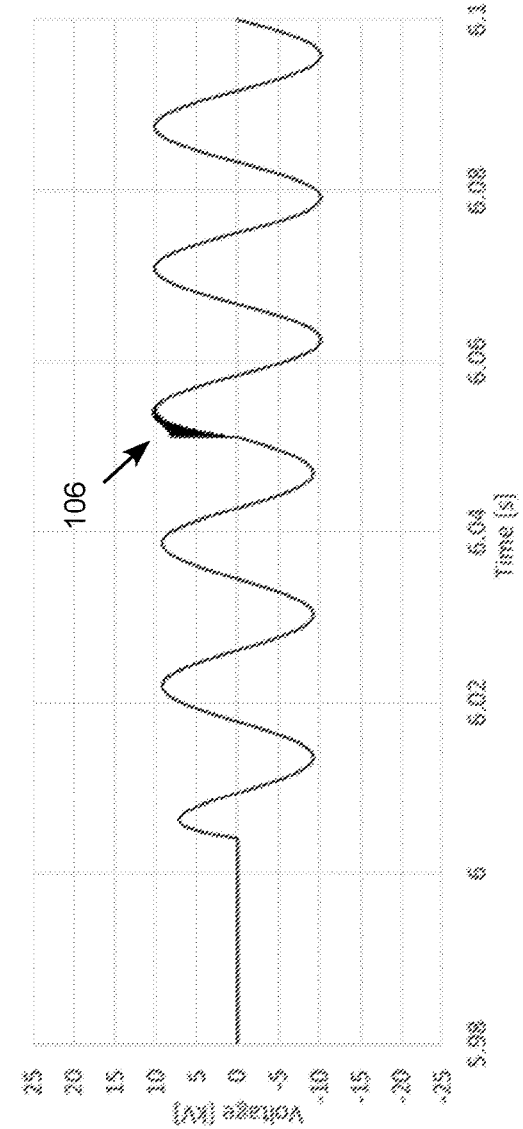

FAULT-PREVENTING CIRCUIT RECLOSER

REFERENCE TO RELATED APPLICATION

This application claims priority to commonly owned U.S. Provisional Application Ser. No. 62/619,706 entitled "Resistor Limited Multi-Interrupter Switch" filed on Jan. 19, 2018, which is incorporated by reference.

TECHNICAL FIELD

The present invention is directed to electric power systems and, more particularly, to a fault-preventing circuit recloser that uses power line current and voltage measurements to control ballast impedance insertion during recloser opening and closing operations to prevent the recloser from closing into a fault.

BACKGROUND

Electric utility customer complaints increase when there are unplanned outages and sporadic voltage sags that interrupt or damage computer equipment, renewable generation resources, and other sensitive loads. Voltage reductions from switching faulted lines into load-carrying circuits can cause these types of voltage dips and also increase the number of customers suffering outages caused by line faults. Federal regulators can fine utilities for unplanned outages. Routinely switching faulted circuits into load-carrying circuits can therefore cause potentially disruptive voltage dips, increase the number of customers impacted by line faults, and result in fines and dissatisfied customers. There is, therefore, a need for a circuit recloser that avoids switching a faulted line into a load-carrying circuit.

SUMMARY

The present invention may be embodied in a fault-preventing circuit recloser that avoids switching a faulted line into a load-carrying circuit. An illustrative embodiment includes a fault-preventing circuit recloser for electrically connecting a source-side circuit of an electric power line to a load-side circuit of the electric power line. The recloser includes a first switch connected to the source-side circuit, a second switch connected to the load-side circuit, a ballast impedance connected to the first and second switches, and a power line monitor operative for obtaining a current and a voltage associated with the electric power line. A controller operatively connected to the power line monitor is configured to receive one or more signals representative of the current and voltage measurements.

If the recloser is performing a circuit closing operation, the controller closes the first switch to initially connect the ballast impedance in series between the source-side circuit and the load-side circuit. The controller then determines whether the source-side circuit is experiencing a fault condition based on the current and voltage measurements. The controller then reopens the first switch in response to determining that the source-side circuit is experiencing a fault condition. The fault-condition delay is typically less than one power system cycle (e.g., about 10 to 15 milliseconds). Alternatively, if a fault condition is not detected, the controller closes the second switch to bypass the ballast resistor and complete the closing operation. In an illustrative embodiment, the non-fault-condition delay is six power system cycle (e.g., about 100 milliseconds).

Additionally or alternatively, if the recloser is performing a circuit opening operation, the controller determines whether the circuit is experiencing a fault condition based on the current and voltage measurements. If a fault condition is detected, the controller opens the second switch to initially connect the ballast impedance in series between the source-side circuit and the load-side circuit, and then opens the first switch to complete the opening operation after a fault-condition delay. If, on the other hand, a fault condition is not detected, the controller opens the second switch to initially connect the ballast impedance in series between the source-side circuit and the load-side circuit, and then opens the first switch to complete the opening operation after a non-fault-condition delay. For the opening operation, the fault-condition delay is shorter than the non-fault-condition delay. For example, the fault-condition delay may be less than one power system cycle (in the range of about 10 to 15 milliseconds), whereas the non-fault-condition delay may be in the range of about 12 to 15 power system cycles (in the range of about 200 to 250 milliseconds).

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIG. 4A is a conceptual illustration of a first state of a fault-preventing circuit recloser during a circuit closing operation.

FIG. 4B is a conceptual illustration of a second state of the fault-preventing circuit recloser during the circuit closing operation.

FIG. 4C is a conceptual illustration of a third state of the fault-preventing circuit recloser during the circuit closing operation.

FIG. 8A is a conceptual illustration of a first state of a fault-preventing circuit recloser during a circuit opening operation.

FIG. 8B is a conceptual illustration of a second state of the fault-preventing circuit recloser during the circuit opening operation.

FIG. 8C is a conceptual illustration of a third state of the fault-preventing circuit recloser during the circuit opening operation.

FIG. 9A is a graph illustrating an electric power line switch opening current without a ballast impedance.

FIG. 9B is a graph illustrating an electric power line switch opening voltage without a ballast impedance.

FIG. 10A is a graph illustrating an electric power line switch opening current with a ballast impedance.

FIG. 10B is a graph illustrating an electric power line switch opening voltage with a ballast impedance.

DETAILED DESCRIPTION

Figure 1:
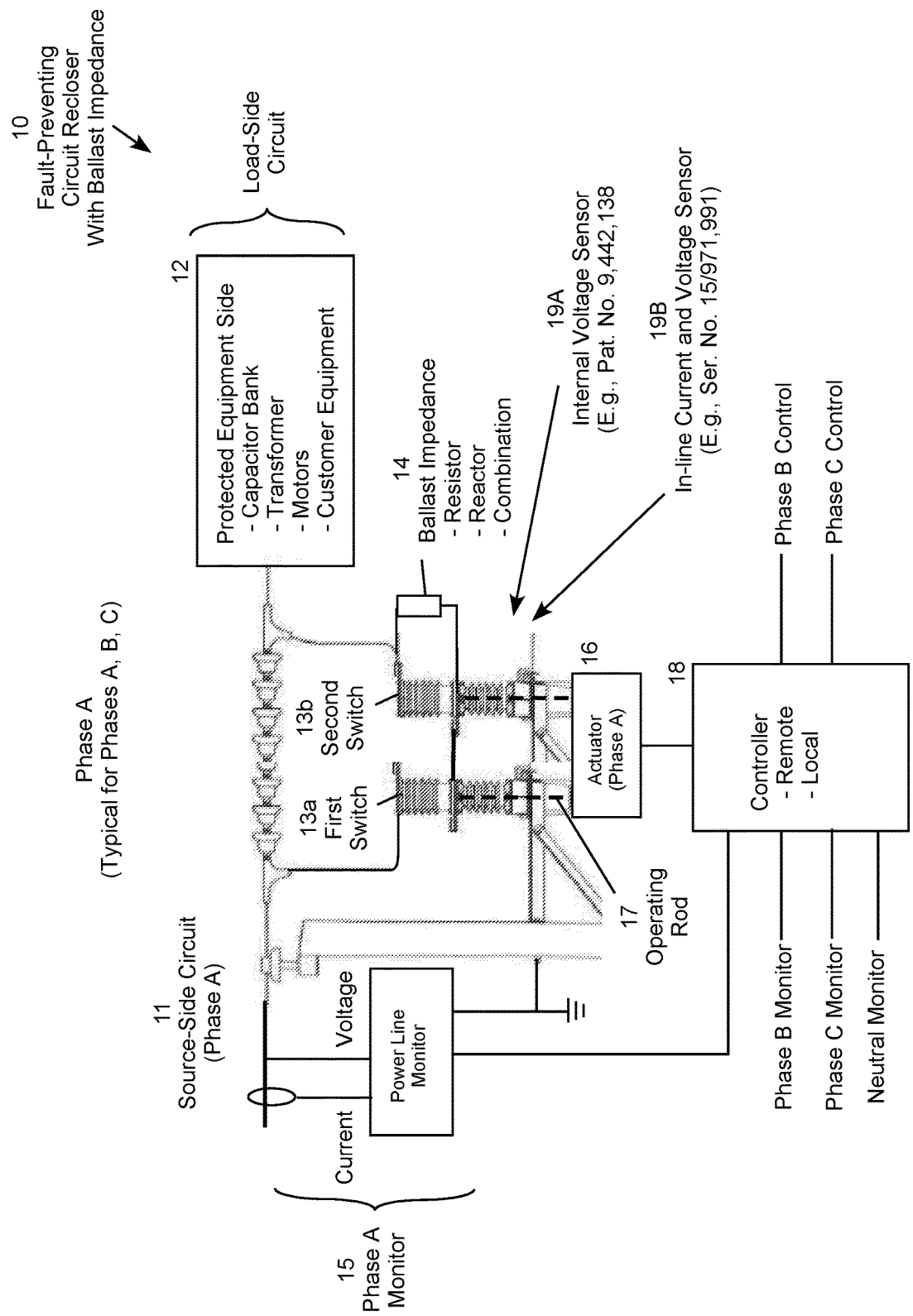
FIG. 1 is conceptual illustration of a fault-preventing circuit recloser with a ballast impedance.

Embodiments of the invention include a fault-preventing circuit recloser (also referred to as a "recloser" or "switch"), an electric power system including the fault-preventing circuit recloser, and a method for operating the fault-preventing circuit recloser. In a particular embodiment, the fault-preventing circuit recloser includes a ballast impedance, power line current and voltage monitors, and controller that operates the switch based on measurements obtained from the current and voltage monitors. The controller aborts the closing (i.e., reopens the switch) when the controller detects that the switch has closed into faulted line. The circuit recloser temporarily introduces the ballast impedance into the circuit (referred to as the "ballast impedance insertion time") during the closing operation to limit the current spike and voltage dip caused by initially closing the switch into the faulted line. The circuit recloser also temporarily introduces the ballast impedance into the circuit during the opening operation to limit the voltage transient that can be caused by initially opening a load-carrying power line. Different ballast resistor insertion times are applied depending on the type of recloser operation (opening or closing) and whether a fault is detected.

The fault-preventing circuit recloser initially introduces a high-resistance ballast impedance in series between the source power line energizing the ballast impedance (also referred to as the "monitored power line" or "source-side circuit") and the load (also referred to as the "energized circuit" or "load-side circuit") to limit the initial current flow and voltage sag. The current through the ballast impedance provides a test current, and the voltage of the load-side circuit provides a test voltage, that the controller of the recloser uses to detect the impedance and fault conditions on the source-side circuit. While the ballast impedance is connected in the circuit, the recloser detects whether there is a fault condition on the source-side circuit, such as a low impedance characteristic of a short, a high current spike and/or a significant voltage dip. If a fault condition is not detected, the recloser shorts (bypasses) the ballast impedance to significantly diminish the electric effect of the ballast impedance. If a fault condition is detected, on the other hand, the recloser reopens rather than shorting out the impedance to prevent the energized circuit from experiencing any significant voltage drop or current spike from the fault on the source-side circuit.

As a result of the operation of the fault-preventing circuit recloser, the load-side circuit that the recloser closes into the faulted line-side circuit does not experience the fault condition because the ballast impedance limits the current close to the rated or normally experienced load current. A typical fault current is about 10-20 times the normal load current. The fault-preventing circuit recloser detects the fault condition without actually exposing the load-side circuit to the full fault current that would have been experienced in the absence of the ballast impedance. This prevents the electric power system from experiencing and responding to the fault, which could take the entire circuit out of service putting the lights out for a number of other customers. This is very undesirable in the current electric power environment as the increasing number of computers, renewable resources and other sensitive loads increases the need for high quality power free from the current spikes and voltage sags caused by power line faults.

In addition to actual line faults, switching a motor, transformer or other large reactive load can initially behave like a line fault due to the high inrush current and voltage dip that typically occurs during initial energization of inductive windings. For example, each renewable generation resource, such as a solar panel installation, may have multiple transformers that produce inrush currents significantly more than the normal or rated load current. This causes voltage drops that impact other customers. A capacitor bank can also behave initially like a line fault due to a high charging current and voltage dip that typically occurs during initial charging of the capacitors. The fault-limiting circuit recloser avoids this problem by temporarily introducing the ballast impedance into the circuit to limit the capacitor charging current. Proper sizing of the ballast impedance limits the inrush current to the range of the rated or normal experienced load current.

The fault-limiting circuit recloser temporarily introduces the ballast impedance into the circuit, detects the circuit impedance and, if the impedance is low as would be the case for a fault, reopens the circuit (trips the impedance). Should normal circuit load conditions exist, then the circuit recloser shorts (bypasses) the ballast impedance and the load-side circuit is energized without any further event. This approach also limits the current delivered to a faulted device during attempted circuit reclosing to minimize damage to the faulted device. For example, the current limiting effect of the fault-limiting circuit recloser prevents the full fault current from being delivered to a faulted motor, transformer or capacitor bank, which prevents further damage to the faulted device from attempted circuit reclosing. Detecting this faulted condition without delivering a high fault current to the faulted device traditionally requires a field crew to take the faulted device out of service for testing. This is time consuming and expensive, and may require an extended power outage while the faulted device is taken out of service for testing.

The use of current and/or voltage sensors on the lines, and possibly on both sides of the fault-preventing circuit recloser, makes determination of the fault condition easier and much more reliable. Control devices using this information can then also make the proper decisions to determine the best corrective action to be taken.

It may not necessary to have fault-preventing circuit recloser with ballast impedances on all phases because ungrounded circuits typically require two phase lines connected to the source to provide power flow. In this configuration, a fault-preventing circuit recloser is only required on one of the phases lines, which makes this solution more economical for these ungrounded circuits.

The fault-preventing circuit recloser prevents system faults from closing actions of switching devices that would otherwise cause undesirable voltage reductions and power outages. Other techniques to do this are cost prohibitive and labor intensive. All types of switching devices can be used but at distribution voltages, vacuum switches are prevalent. The opening transients on transformers are quite severe and switch reignitions (also called "restrikes") can be quite damaging to transformers and capacitor banks because of the extremely fast voltage collapse and the resultant turn-to-turn voltages that result. The impedance-limited switch also reduces these transients during switch opening. Although the fault-preventing circuit recloser is not dependent on the power line voltage, most of the problems resolved by the fault-preventing recloser occur on distribution circuits operated at or below 38 kV, which experience low impedance faults and transformer switching transients much more frequently than sub-transmission and transmission lines operated above 38 kV.

The ballast impedance may be a resistor, an inductor (also call a "reactor," "coil" or "choke") or a combination of resistive and reactive components. In alternative configurations, the circuit recloser may utilize a single-stage or multi-stage ballast impedance. Inductors have the ability to withstand high load currents better than resistors but are generally more expensive. A resistor may therefore be the preferred type of ballast impedance in many situations, while a reactive ballast impedance or a ballast impedance with resistive and reactive components may also provide effective solutions in many cases.

The fault-preventing circuit recloser may utilize a conventional current sensor ordinarily positioned around the monitored electric power line and a conventional voltage monitor connected to the monitored electric power line or a voltage signal received from a substation connected the monitored electric power line. Alternatively, the circuit recloser may utilize am internal voltage monitor as described in U.S. Pat. No. 9,442,138 and/or in-line current and/or voltage sensors as described in U.S. Ser. No. 15/971, 991, which are both incorporated herein by reference.

FIG. 1 is conceptual illustration of a representative fault-preventing circuit recloser 10 for one phase (Phase A) for a three-phase power line. Each phase of the power line includes its own independently operating circuit recloser. In this example, the circuit recloser 10 is configured and operated to prevent the load-side circuit 12 from experiencing the full fault current that would occur from closing into a fault on the source-side circuit 11 in the absence of the ballast impedance. For example, recloser operation typically occurs during sectionalizing used to isolate faulted equipment and line segments. In a conventional sectionalizing operation, a conventional recloser may attempt to reclose into a fault on the source-side circuit 11 two or three times before locking out. This exposes the load-side circuit 12 to two or three reclosing fault conditions in addition to the original fault that initially tripped the recloser. Similar fault-like conditions can occur from inrush currents when the load-side circuit 11 includes a significant motor, transformer or capacitor load that is being energized. The operation of the recloser 10 prevents the load-side circuit 12 from experiencing the high currents and voltage dips that occur from these types of faults and fault-like conditions.

The circuit recloser 10 includes two switches 13a and 13b connected in series between the power system or source-side circuit 11 and the load-side circuit 12. The first switch 13a is configured and operated to initially and temporarily introduce a ballast impedance 14 into the circuit in series between the source-side circuit 11 and the load-side circuit 12. When a fault condition is detected, the first switch 13a is reopened to abort the closing operation. Alternatively, when a fault condition is not detected, the second switch 13b is configured and operated to short out (bypass) the ballast impedance 14 to greatly diminish the effect of the ballast impedance to complete the circuit closing procedure. The circuit recloser 10 also includes a power line monitor 15 that typically includes both a current monitor and a voltage monitor because, in general, both the current measurement and the voltage measurement are used to compute the circuit impedance for fault detection. An actuator 16 physically moves the operating rods 17 that open and close the switches 13a and 13b. A computer-operated controller 18 that utilizes a microprocessor to implement computer software instructions receives signals representative of the current and voltage measurements from the power line monitor 15 and operates the switches 13a and 13b in accordance with a computer-implemented methodology. The controller may be local and directly connected to the actuator 16, or the controller may be remote, such as a controller in a SCADA or other central control station in communication with the actuator 16.

More specifically, in a closing operation the controller 18 initially closes the first switch 13a, which temporarily connects the source side circuit 11 to the load-side circuit 12 through the ballast impedance 14. The ballast impedance limits the current through flowing to the load-side circuit 12 to a test current generally within the rated current or a normally occurring load current for the power line. The controller 18 then uses the current and voltage measurements to determine whether the switch 13a is attempting to switch the load-side circuit 12 into a fault on the source-side circuit 11, typically by determining whether the impedance on the source-side circuit is at a very low level characteristic of a faulted condition. If the controller 18 determines that the recloser 10 is attempting to switch the load-side circuit 12 into a fault on the source-side circuit 11, then the controller reopens the first switch 13a and aborts the closing operation. On the other hand, if the controller 18 determines that the recloser is not attempting to switch the load-side circuit 12 into a fault on the source-side circuit 11, then the controller closes the switch 13b to short out (bypass) the ballast impedance 14 to complete the closing operation. If a fault is detected, the controller 18 typically aborts this operation in less than one electric power cycle (about 10 to 15 milliseconds) so that the load-side circuit 12 experiences less than one full cycle of the impedance-limited fault, which keeps the current on the load-side circuit 12 within the rated or normally occurring current for the circuit. If, on the other hand, a fault is not detected, the controller 18 completes circuit closing operation (i.e., the ballast impedance insertion time) within about six electric power cycles (about 100 milliseconds), which is sufficient to prevent a significant current spike and voltage sag from occurring on the circuit.

Although the fault-preventing circuit recloser 10 does not depend on the type of switches 13a and 13b, each switch may include a penetrating or butt contactor housed within a sealed container filled with a vacuum or dielectric gas (e.g., SF6). These types of switches are well known in the industry. In addition, although the power line monitor 15 is illustrated as physically separate and spaced apart from the switches 13a and 13b, the fault-preventing circuit recloser 10 is not dependent on this configuration. For example, the current monitor, the voltage monitor, or both could be replaced by one or more of a voltage sensor located inside the switch as described in U.S. Pat. No. 9,442,138 and/or an in-line current and/or voltage sensor as described in U.S. Ser. No. 15/971,991, which are both incorporated herein by reference.

While short ballast impedance insertion times, such as less than one cycle, are desirable for aborting a closing procedure when a fault is detected, this type of short insertion time is not effective for limiting inrush currents. Completing a recloser closing procedure with a very short ballast impedance insertion time can therefore cause inrush currents greater than the rated or normal load current of the circuit, which results in a significant voltage drop that can damage sensitive loads. Controlling the fault-preventing recloser 10 based on real-time current and voltage measurements allows the recloser to adjust its operation, including the ballast impedance insertion time, depending on the current and voltage measurements initially detected during a test current period, typically during the first cycle of recloser operation. This allows the recloser 10 to apply a different operation depending on whether a fault is detected during first cycle of operation. For the circuit closing operation, the test current procedure prevents the recloser from closing into a fault after a minimal test current period. If the recloser is closing into a fault, the reclosing operation is aborted typically within one cycle (about 10-15 milliseconds). If the recloser is not closing into a fault, the recloser completes the closing operation while leaving the ballast impedance in the circuit for a longer period, typically about 6 cycles (about 100 milliseconds), which is long enough to prevent the circuit from experiencing a current spike well above the rated or normal load current and an associated voltage sag. For a transformer switching example, the ballast impedance is sized to limit the transformer inrush current to less than the normal or rated load current. This is desirable to minimize resultant voltage drops on the power system that interfere with normal operation of sensitive loads connected in the same and nearby circuits.

For a circuit opening procedure, the recloser 10 detects whether the opening operation is occurring during a fault condition. If there is a fault condition on the circuit, the recloser 10 completes the opening operation as quickly as possible, typically within one cycle (about 10-15 milliseconds). If the opening operation is not occurring during a fault condition, however, the recloser 10 maintains the ballast impedance insertion for a longer period of time, such as 12 to 15 cycle (about 200-250 milliseconds). This extended ballast impedance insertion time is selected to be sufficient to prevent undesirable voltage transients during the circuit opening procedure, and to also prevent a restrike from occurring within the recloser 10. The illustrative 12 to 15 cycle extended ballast impedance insertion time has been selected to prevent restrikes known to occur in vacuum switches during this time period, which is more likely to occur at higher voltages. The extended delay period may be lower for lower voltages and for switches filled with a dielectric gas (e.g., SF6) that extinguish arcs more effectively than vacuum switches. Restrikes may also be more problematic for certain types loads, such as capacitor banks. The extended delay period may therefore be varied as a matter of design choice based on the operating voltage, the type of switches involved, the type of load being switched, and other relevant factors. For example, reclosers connecting largely resistive residential loads may be programmed for shorter ballast impedance times (e.g., about 3 cycles or 50 milliseconds), while reclosers connecting transformers, capacitor banks and other loads that impose large inrush currents loads may be programmed for longer ballast impedance times (e.g., about 6 cycles or 100 milliseconds). The recloser 10 may also apply a different operating procedures and ballast impedance insertion times depending on whether the recloser is performing a closing operation (as shown in FIG. 2A) or an opening operation (as shown in FIG. 2B).

Figure 2A:
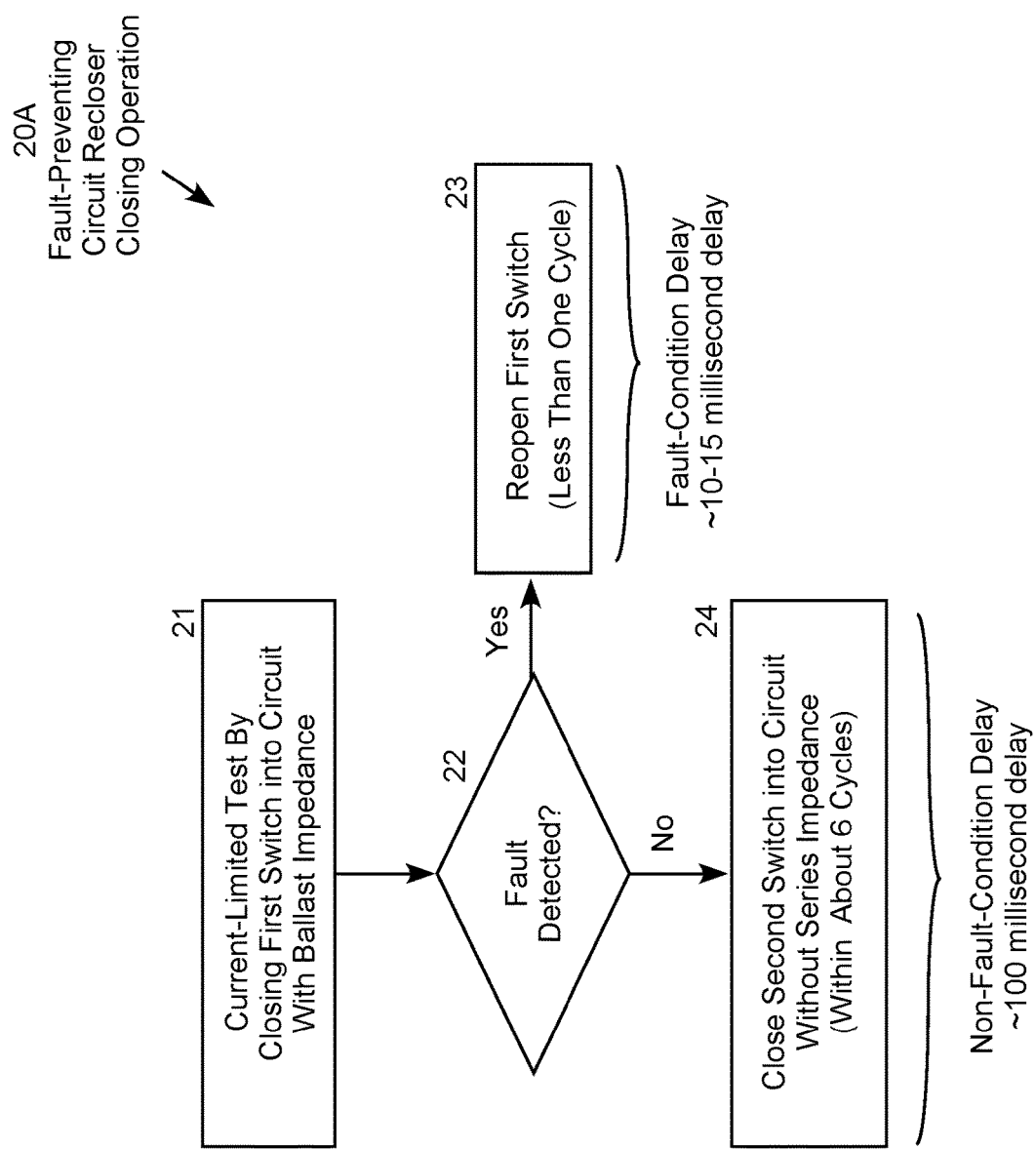
FIG. 2A is a logic diagram for operating the fault-preventing circuit recloser in a circuit closing operation.

FIG. 2A (see also 4A-C) is a logic diagram 20A for operating the fault-preventing circuit recloser 10 in an illustrative example of a circuit closing operation. In step 21, the controller 18 conducts a current-limited test by closing the first switch 13a to connect the ballast impedance 14 into the circuit between the source-side circuit 11 and the load-side circuit 12. Step 21 is followed by step 22, in which the controller 18 uses the current and voltage measurements to determine whether a fault condition exists. In this example, the controller 18 determines whether the source-side circuit 11 includes a fault, typically by determining whether the impedance on the load side is very low, which is characteristic of a faulted circuit. If a fault is detected, the "yes" branch is followed from step 22 to step 23, in which the controller 18 reopens the first switch 13a and aborts the closing operation. In this example, the closing operation is aborted, and the first switch 13a reopened, within one electric power cycle (about 10 to 15 milliseconds). If a fault is not detected, the "no" branch is followed from step 22 to step 24, in which the controller 18 closes second switch 13b to short out (bypass) the ballast impedance 14 to complete the switch closing operation. In this case, the controller 18 leaves the ballast impedance 14 connected in the circuit, without being shorted out (bypassed) by closing the second switch 13b for about six electric power cycles (about 100 milliseconds). The logic diagram 20A is described above in the context of preventing the recloser 10 from closing the load-side circuit 12 into a fault on the source side circuit 11. It should also be appreciated that an equivalent procedure may be used to prevent the recloser from closing the source-side circuit into a fault on the load-side circuit 12, which may also occur during outage isolating (sectionalizing) and re-powering operations.

Figure 2B:
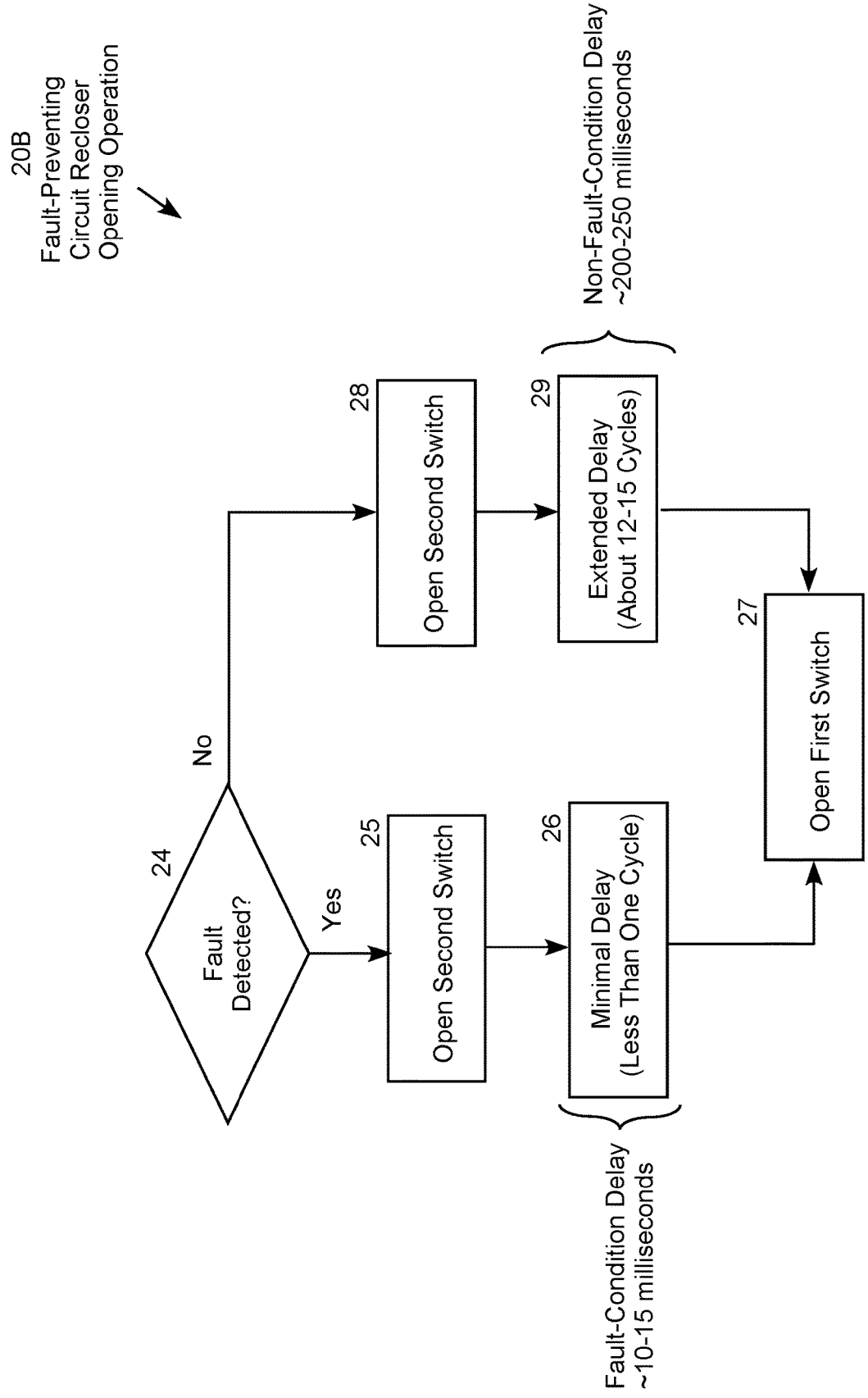
FIG. 2B is a logic diagram for operating the fault-preventing circuit recloser in a circuit opening operation.

FIG. 2B (see also 8A-C) is an illustrative example of a logic diagram 20B for operating the fault-preventing circuit recloser 10 in a circuit opening operation. In step 24, the controller 18 uses the current and voltage measurements to determine whether a fault condition exists. If a fault is detected, the "yes" branch is followed from step 24 to step 25, in which the controller 18 opens the second switch 13b to insert the ballast impedance 14 into the circuit. Step 25 is followed by step 26, in which the controller applies a minimal fault condition delay, typically within one cycle (about 10 to 15 milliseconds). Step 26 is followed by step 27, in which the controller opens the first switch 13a to complete the circuit opening procedure for the detected fault condition. If a fault is not detected, the "no" branch is followed from step 24 to step 28, in which the controller 18 opens the second switch 13b to insert the ballast impedance 14 into the circuit. Step 28 is followed by step 29, in which the controller applies an extended non-fault condition delay, for this example in the range of 12 to 15 cycle (about 200 to 250) milliseconds. Step 29 is followed by step 27, in which the controller opens the first switch 13a to complete the circuit opening procedure for the detected non-fault condition.

Figure 3A:
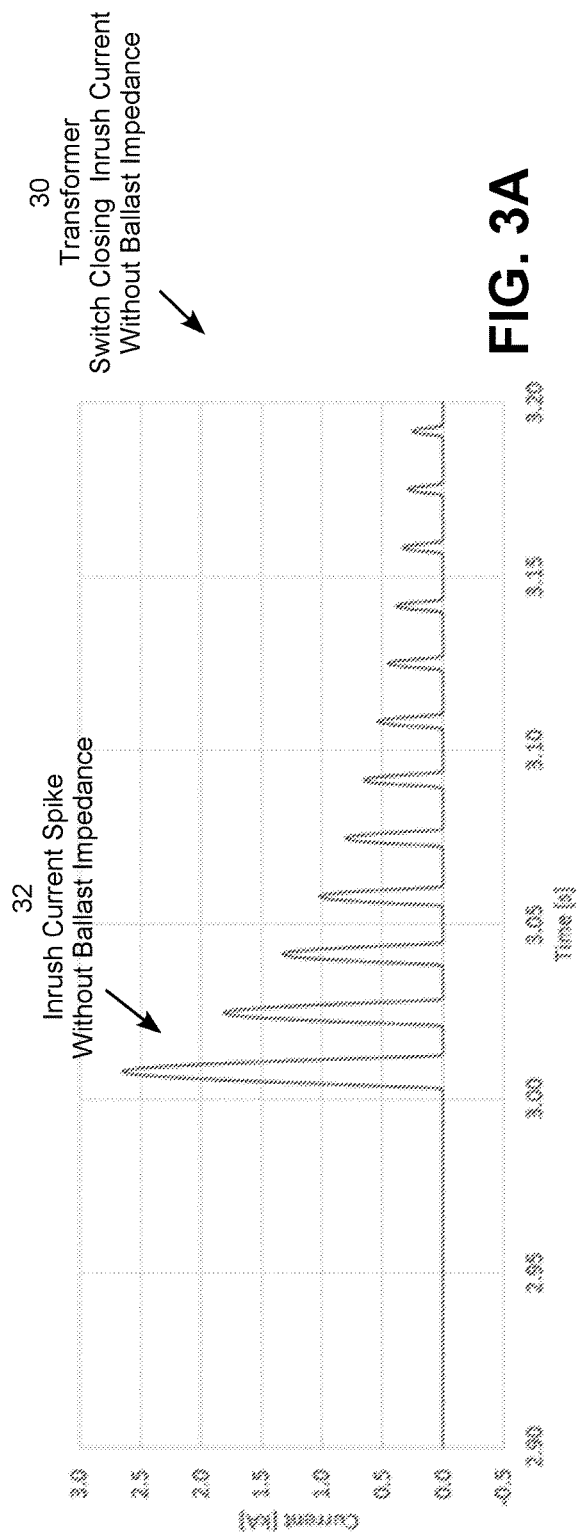
FIG. 3A is a graph illustrating a transformer switch closing inrush current without a ballast impedance.
Figure 3B:
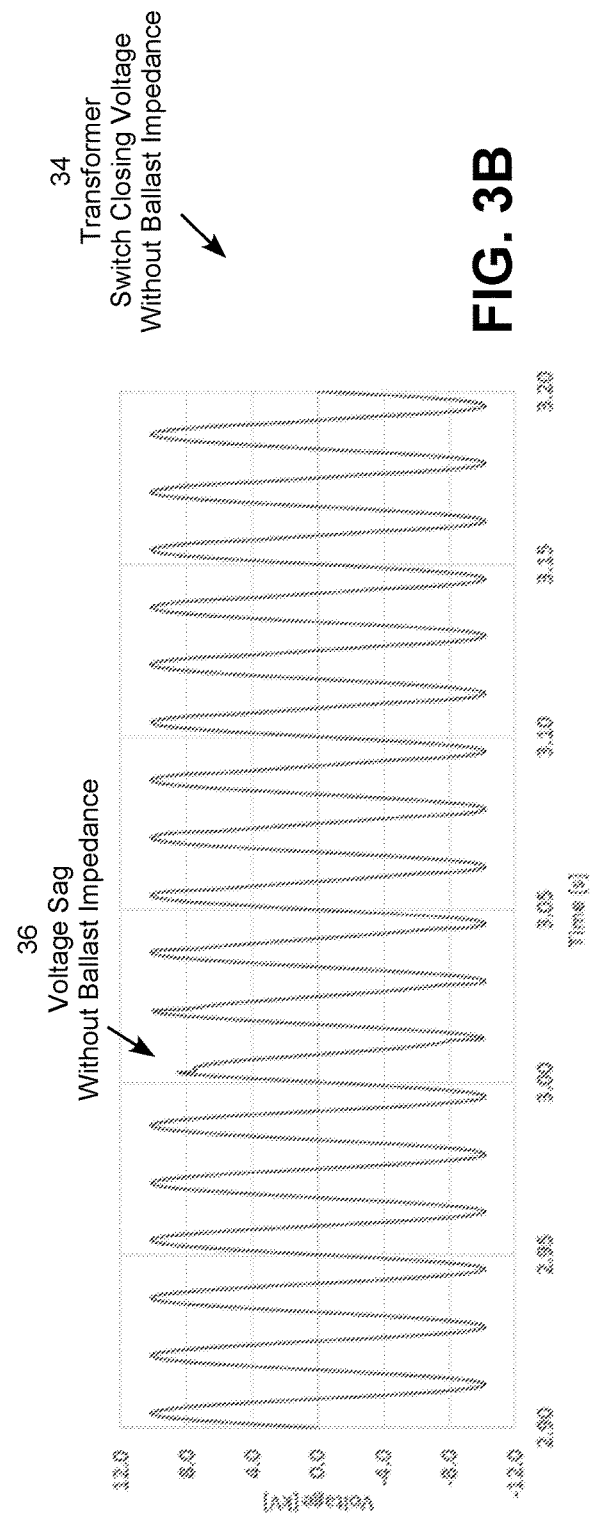
FIG. 3B is a graph illustrating a transformer switch closing voltage without a ballast impedance.

When the fault-preventing circuit recloser 10 operates in a closing operation, the temporary introduction of the ballast resistor 14 in series between the source-side circuit 11 and the load-side circuit 12 provides the benefit of limiting the inrush current drawn by energizing devices, such as motors, transformers and capacitor banks. The recloser 10 therefore provides operational benefits to the electric power system both when the closing operation is aborted, and when the closing operation is completed (e.g., inrush currents on the load-side circuit are tempered by initially connecting the load-side circuit through the ballast resistor for FIG. 3A is a graph 30 illustrating the transformer inrush current when the load-side circuit includes a transformer that is energized by a circuit recloser that does not utilize a ballast resistor. In this example, the transformer initially experiences a large current spike 32 that is more than 2.5 times the rated or normal line current. Current spikes occur well above the rated or normal line current persist for several cycles after the transformer begins to energize. FIG. 3B is a graph 34 illustrating the circuit voltage as disturbed by the transformer inrush current shown in FIG. 3A. The circuit voltage experiences a pronounced initial voltage sag 36 corresponding to the initial current spike 32, followed by smaller voltage sags corresponding to the smaller current spikes for several cycles after switch closing.

The current spikes and voltage sags illustrated in FIGS. 3A and 3B are avoided by closing the circuit with the fault-preventing circuit recloser 10 that initially connects the ballast impedance 14 in series between the source-side circuit 11 and the load-side circuit 12 containing the transformer to limit the transformer inrush current. FIG. 4A shows the first state of the recloser 10 prior to initiating the closing operation where the first switch 13a and the second switch 13b are both open. FIG. 4B shows the second state of the recloser after the first switch 13a has been closed to connect the ballast impedance 14 in series between the source side circuit 11 and the load-side circuit 12. FIG. 4C shows the third state of the recloser after the second switch 13b has been closed, following a delay of about six electric power cycles, to short out and effectively bypass the ballast impedance 14 in the circuit.

Figure 5A:
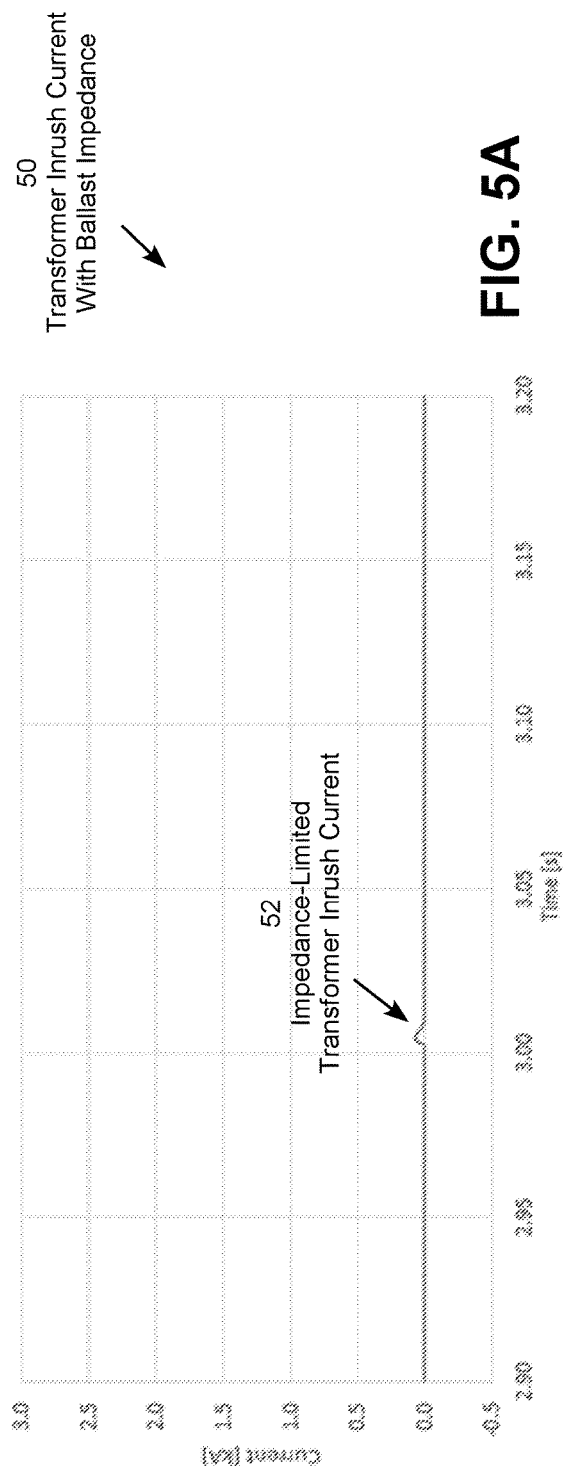
FIG. 5A is a graph illustrating a transformer inrush current with a ballast impedance.
Figure 5B:
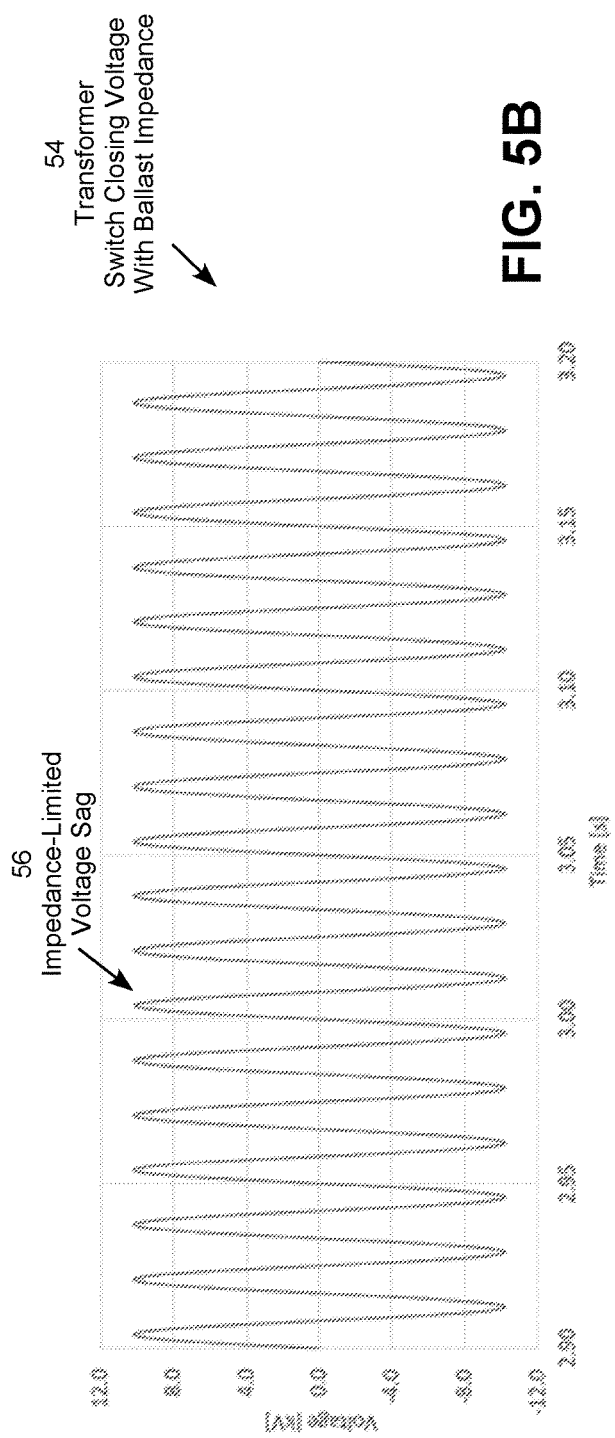
FIG. 5B is a graph illustrating a transformer switch closing voltage with a ballast impedance.

FIGS. 5A and 5B show the electrical effect of the operation the fault-preventing circuit recloser operation illustrated by FIGS. 4A-4C. FIG. 5A is a graph 50 illustrating a transformer inrush current as limited by the ballast impedance 14. As can be seen in FIG. 5A, the impedance-limited inrush current 52 is much smaller than the inrush current 32 shown in FIG. 3A without the ballast impedance 14. Similarly, the impedance-limited voltage sag 56 is much smaller than the voltage sag 36 shown in FIG. 3B without the ballast impedance 14.

Figure 6A:
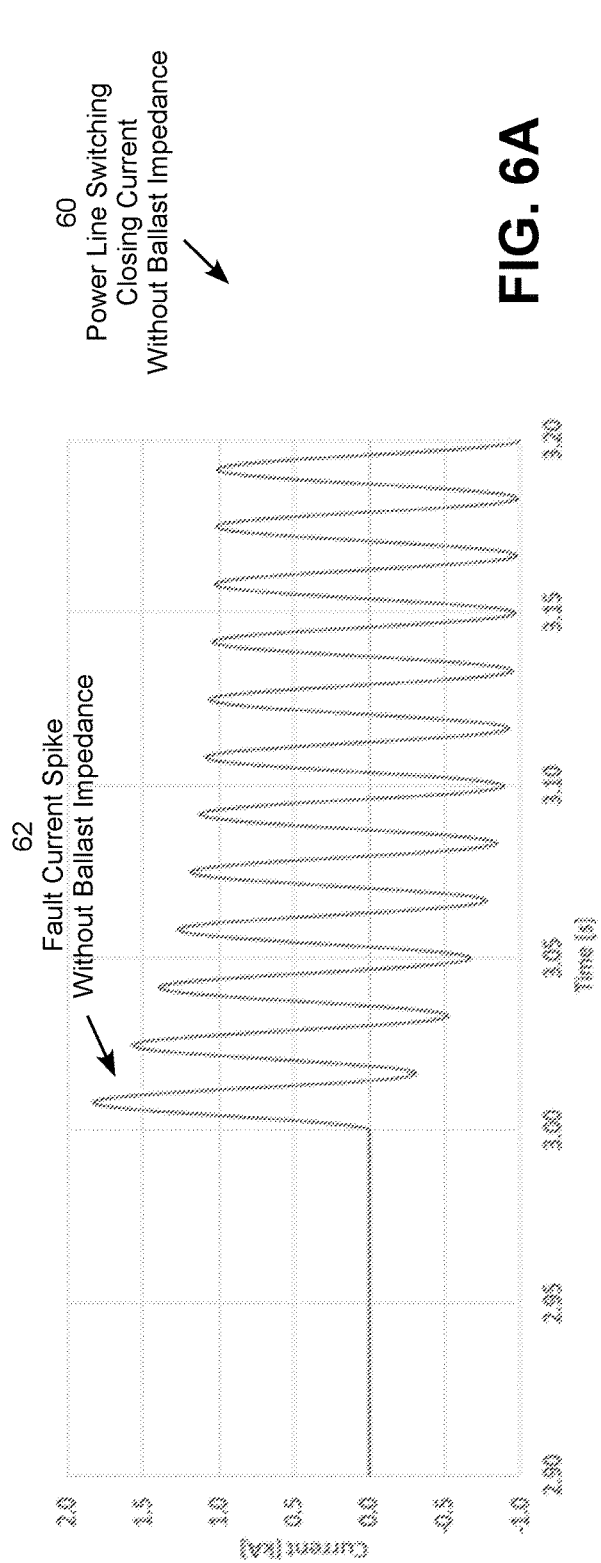
FIG. 6A is a graph illustrating an electric power line switch closing current without a ballast impedance.
Figure 6B:
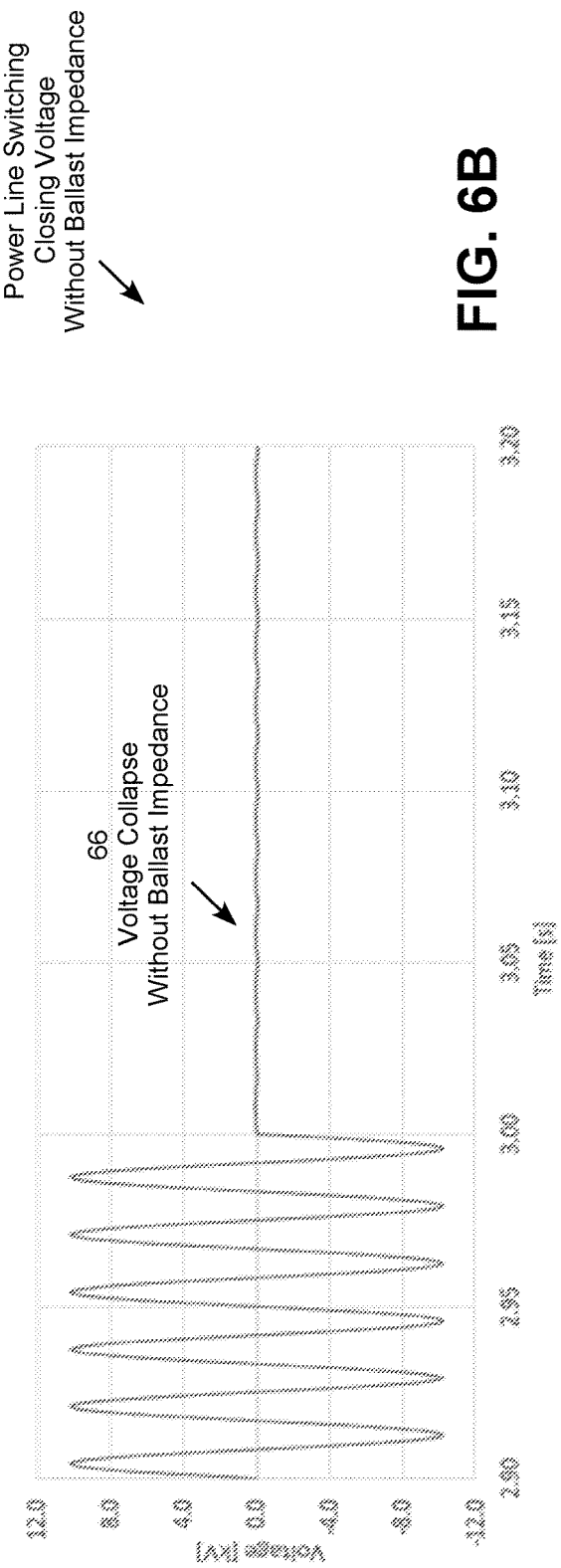
FIG. 6B is a graph illustrating an electric power line switch closing voltage without a ballast impedance.

FIGS. 6A and 6B illustrate the case where the recloser 10 connects the load-side circuit 12 into a fault on the source-side circuit 11 without a ballast impedance. FIG. 6A is a graph 60 illustrating the power line current when the recloser closes into a fault, which includes a fault current spike 62 that is nearly two times the rated or normal load current. Additional current spikes well over the rated or normal load current persist for several cycles. FIG. 6B is a graph 64 illustrating the power line voltage when the recloser closes into the fault, which includes a nearly complete voltage collapse 66 after the switch is closed.

Figure 7A:
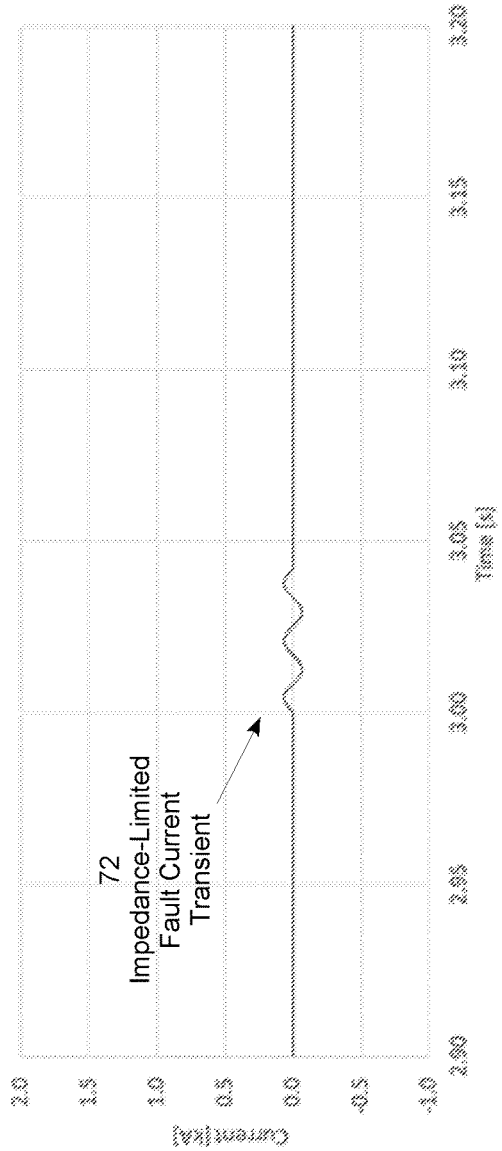
FIG. 7A is a graph illustrating an electric power line switch closing current with a ballast impedance.
Figure 7B:
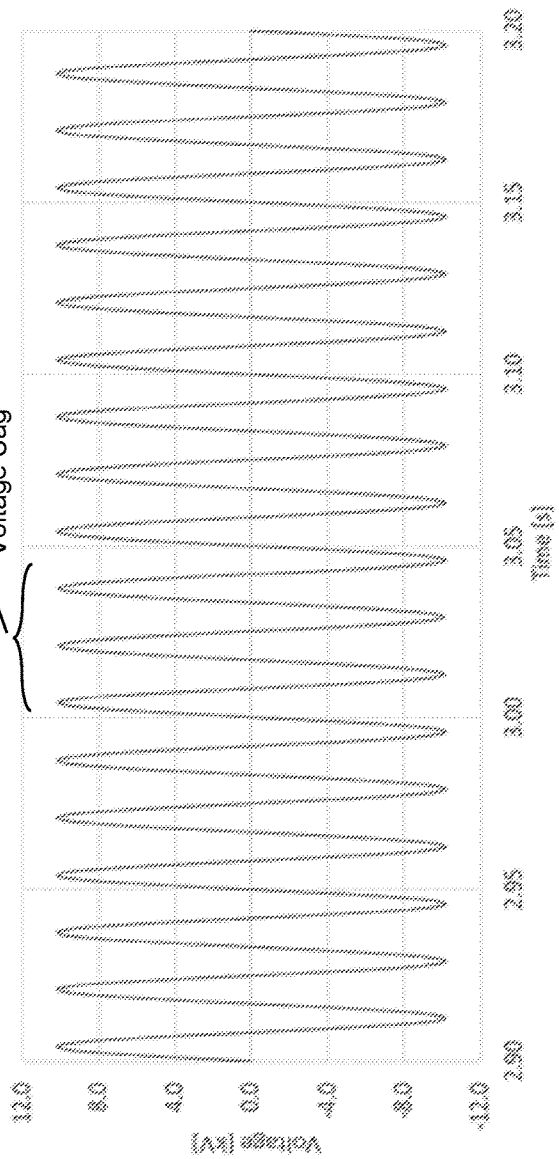
FIG. 7B is a graph illustrating an electric power line switch closing voltage with a ballast impedance.

The current spikes and voltage collapse illustrated in FIGS. 6A and 6B are avoided by closing the circuit with the fault-preventing circuit recloser 10 that initially connects the ballast impedance 14 in series between the source-side circuit 11 and the load-side circuit 12. FIG. 7A is a graph 70 illustrating the power line current when the fault-preventing circuit recloser 10 initially connects the ballast impedance 14 in series between the faulted source-side circuit 11 and the load-side circuit 12. As can be seen in FIG. 7A, the impedance-limited fault current transient 72 is much smaller than the fault current spike 52 shown in FIG. 6A. FIG. 7B is a graph 74 that illustrates the power line voltage when the fault-preventing circuit recloser 10 initially connects the ballast impedance 14 in series between the faulted source-side circuit 11 and the load-side circuit 12. Here, the impedance-limited voltage sag 76 is virtually imperceptible as compared to the nearly complete voltage collapse 66 in FIG. 6B.

FIGS. 5A-5B illustrate the benefit of the fault-preventing circuit recloser 10 when energizing a device imposing a significant inrush current on the electric power system, while 7A-7B illustrate the benefit of the fault-preventing circuit recloser 10 when closing into a fault. It should also be appreciated that the fault-preventing circuit recloser 10 produces benefits when opening the connection between the source-side circuit 11 and the load-side circuit 18. FIG. 8C is a conceptual illustration of the first state of a fault-preventing circuit recloser 10 during a circuit opening operation, where the switches 13a and 13b are both closed prior to recloser operation. FIG. 8B is a conceptual illustration of the second state of the recloser 10 where the second switch 13b is opened to connect the ballast impedance 14 in series between the source-side circuit 11 and the load-side circuit 12. FIG. 8A is a conceptual illustration of the third state of the recloser 10 where, following a delay of about 12 to 15 electric power cycles, the first switch 13a is opened to electrically disconnect the source-side circuit 11 from the load-side circuit 12.

FIG. 9A is a graph 90 illustrating the power line current when a recloser is operated to open the connection between the source-side circuit 11 and the load-side circuit 12 without a ballast resistor. As can be seen in FIG. 9A, the power line current experiences a complete collapse 92 to zero almost immediately upon switch operation. FIG. 9B is a graph 94 illustrating the electric power voltage when the recloser is operated to open the connection between the source-side circuit 11 and the load-side circuit 12 without a ballast resistor. As can be seen in FIG. 9B, the power line voltage experiences a major voltage transient 96 almost immediately upon switch operation.

Figure 11:
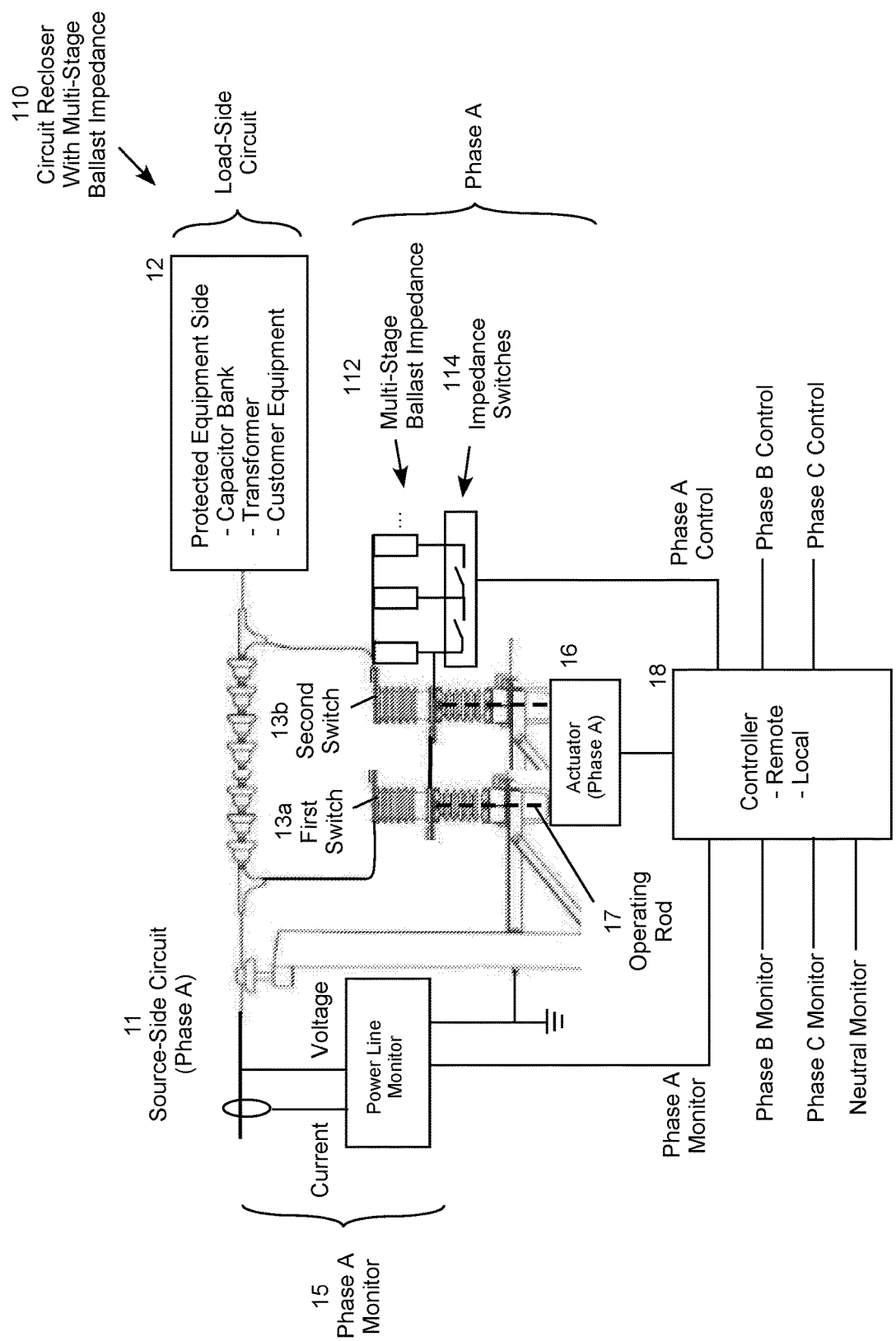
FIG. 11 is conceptual illustration of a fault-preventing circuit recloser with a multi-stage ballast impedance.

The current collapse and major voltage transient illustrated in FIGS. 9A and 9B are avoided by opening the circuit with the fault-preventing circuit recloser 10 that initially connects the ballast impedance 14 in series between the source-side circuit 11 and the load-side circuit 12. FIG. 10A is a graph 100 illustrating the electric power line current when the fault-preventing circuit recloser 10 temporarily introduces the ballast impedance into the circuit during the initial portion of the recloser opening operation. As can be seen in FIG. 10A, the current collapse is tempered by reduced-current stage 102 while the line current is directed through the ballast impedance 14. FIG. 10B is a graph 104 illustrating the electric power line voltage when the recloser 10 temporarily introduces the ballast impedance 14 into the circuit during the initial portion of the recloser opening operation. As can be seen in FIG. 10B, the voltage transient 106 is much smaller than the major voltage transient 96 shown in FIG. 9B FIG. 11 is conceptual illustration of a fault-preventing circuit recloser 110, which is similar to the recloser 10 shown in FIG. 1, except that the recloser 110 includes a multi-stage ballast impedance 112 controlled by staged operation of impedance switches 114. This configuration allows the ballast impedance to be "feathered" by introducing or removing the ballast impedance from the circuit in stages. In this example, one ballast impedance may be initially inserted during a first time period, two ballast impedances connected in parallel may be inserted during a second time period, and three ballast impedances connected in parallel may be inserted during a third time period, followed by shorting out (bypassing) the ballast impedances.

This configuration can be used, for example, to further reduce the voltage transient 106 shown in FIG. 10. The multi-staged ballast impedance may also be used to further reduce the current and voltage transients experienced by circuit reclosers operated at higher voltage and current levels. The specific multi-stage balance impedances and insertion times can be selected as a matter of design choice and may vary based on the type of recloser operation (opening or closing), the circuit voltage, the type of loads being switched, the switches, and other relevant factors.

The present disclosure may be implemented using a controller utilizing a general purpose computing device, such as a microprocessor controlled by specialized computer software. As such, embodiments of the disclosure may comprise adapting or reconfiguring presently existing equipment. Alternatively, original equipment may be provided embodying the disclosure.

All of the methods described in this disclosure may include storing non-transient computer-executable instructions and associated results in a non-transient storage medium. These computer-executable instructions and results may include any of the computer-implemented procedures or results described in this disclosure and may be stored in any manner known in the art. The storage medium may include any storage medium described in this disclosure or any other suitable storage medium known in the art. After the computer-executable instructions or results have been stored, they can be accessed in the storage medium and used by any of the method or system embodiments described in this disclosure, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally comprises one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as microprocessors executing computer-executable software. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that present invention provides significant improvements in electric power circuit reclosers. The foregoing relates only to the exemplary embodiments of the present invention, and that numerous changes may be made therein without departing from the spirit and scope of the invention as defined by the following claims.

The invention claimed is:

1. A fault-preventing circuit recloser for electrically connecting a circuit comprising an electric power line, comprising:
    a first switch connected to the circuit;
    a second switch connected to the circuit in series with the first switch;
    a ballast impedance exhibiting voltage invariant impedance connected in parallel with the second switch and selected to limit a fault current occurring on the electric power line to less than a rated load current during an initial electric power cycle following closing of the first switch;
    a power line monitor operative for obtaining a current and a voltage associated with the electric power line;
    a controller operatively connected to the power line monitor and configured to receive one or more signals representative of the current and voltage measurements, the controller comprising a non-transitory computer storage medium storing computer-executable instructions that, when executed by the controller, cause the controller to perform the steps:
        closing the first switch to initially connect the ballast impedance in series with the first switch;
        determining whether the circuit is experiencing a fault condition during the initial electric power cycle based on the current and voltage measurements, and
        in response to determining that the circuit is experiencing a fault condition during the initial electric power cycle, reopening the first switch during the initial electric power cycle, or
        in response to determining that the circuit is not experiencing a fault condition during the initial electric power cycle, delaying taking action until after initial electric power cycle and closing the second switch after the initial electric power cycle to bypass the ballast impedance in response to determining that the circuit is not experiencing a fault condition.

2. The fault-preventing circuit recloser of claim 1, wherein the ballast impedance comprises a resistor, a reactor, or a combination of a resistor and a reactor.

3. The fault-preventing circuit recloser of claim 1, wherein determining whether the circuit is experiencing a fault condition comprises determining whether the circuit is exhibiting a low impedance indicative of a fault condition.

4. The fault-preventing circuit recloser of claim 1, wherein the ballast impedance comprises a single-stage ballast impedance.

5. The fault-preventing circuit recloser of claim 1, wherein the ballast impedance comprises a multi-stage impedance and an independently operated impedance switch connected to each stage of the multi-stage impedance.

6. The fault-preventing circuit recloser of claim 1, wherein the power line monitor comprises a current monitor positioned external to and spaced apart from the first and second switches.

7. The fault-preventing circuit recloser of claim 1, wherein the power line monitor comprises a voltage monitor positioned internal to one of the switches.

8. The fault-preventing circuit recloser of claim 1, wherein the power line monitor comprises one or more of a voltage monitor and a current monitor positioned inline with and adjacent to one of the switches.

9. A fault-preventing circuit recloser for electrically connecting a circuit comprising an electric power line, comprising:
    a first switch connected to the circuit;
    a second switch connected to the load-side circuit in series with the first switch;
    a ballast impedance exhibiting voltage invariant impedance connected in parallel with the second switch and selected to limit a fault current occurring on the electric power line to less than a rated load current during an initial electric power cycle;
    a power line monitor operative for obtaining a current and a voltage associated with the electric power line;
    a controller operatively connected to the power line monitor and configured to receive one or more signals representative of the current and voltage measurements, the controller comprising a comprising a non-transitory computer storage medium storing computer-executable instructions that, when executed by the controller, cause the controller to perform the steps:
        determine whether the circuit is experiencing a fault condition based on the current and voltage measurements;
        if a fault condition is detected, open the second switch during the first electric power cycle to initially connect the ballast impedance in series between the source-side circuit and the load-side circuit, and open the first switch to complete the opening operation after a fault-condition delay;
        if a fault condition is not detected, open the second switch to initially connect the ballast impedance in series between the source-side circuit and the load-side circuit, and open the first switch to complete the opening operation after a non-fault-condition delay;
        wherein the fault-condition delay is less than the initial electric power cycle and the non-fault-condition delay is greater than the initial electric power cycle.

10. The fault-preventing circuit recloser of claim 9, wherein the fault-condition delay is in the range of 10 to 15 milliseconds.

11. The fault-preventing circuit recloser of claim 9, wherein the non-fault-condition delay is in the range of twelve to fifteen electric power cycles.

12. The fault-preventing circuit recloser of claim 9, wherein:
    the fault-condition delay is less than one electric power cycle; and
    the non-fault-condition delay is in the range of twelve to fifteen electric power cycles.

13. The fault-preventing circuit recloser of claim 9, wherein the ballast impedance comprises a resistor, a reactor, or a combination of a resistor and a reactor.

14. The fault-preventing circuit recloser of claim 9, wherein determining whether the circuit is experiencing a fault condition comprises determining whether the circuit is exhibiting a low impedance indicative of a fault condition.

15. The fault-preventing circuit recloser of claim 9, wherein the ballast impedance comprises a single-stage ballast impedance.

16. The fault-preventing circuit recloser of claim 9, wherein the ballast impedance comprises a multi-stage impedance and an independently operated impedance switch connected to each stage of the multi-stage impedance.

17. The fault-preventing circuit recloser of claim 9, wherein the power line monitor comprises a current monitor positioned external to and spaced apart from the first and second switches.

18. The fault-preventing circuit recloser of claim 9, wherein the power line monitor comprises a voltage monitor positioned internal to one of the switches.

19. The fault-preventing circuit recloser of claim 9, wherein the power line monitor comprises one or more of a voltage monitor and a current monitor positioned inline with and adjacent to one of the switches.

20. A method for operating a fault-preventing circuit recloser for electrically connecting a circuit comprising a source-side circuit of an electric power line to and a load-side circuit of the electric power line, the fault-preventing circuit recloser comprising a first switch connected to the source-side circuit, a second switch connected to the load-side circuit and in series with the first switch, a ballast impedance exhibiting voltage invariant impedance connected in parallel with the second switch and selected to limit a fault current occurring on the electric power line to less than a rated load current during an initial electric power cycle following closing of the first switch, a power line monitor operative for obtaining a current and a voltage associated with the electric power line, a controller operatively connected to the power line monitor, comprising:

receiving one or more signals from the power line monitor representative of the current and voltage measurements;

if the recloser is performing a circuit closing operation:
closing the first switch to initially connect the ballast impedance in series between the source-side circuit and the load-side circuit,
determining whether the circuit is experiencing a fault condition based on the current and voltage measurements,
reopening the first switch during the initial electric power cycle in response to determining that the experiencing a fault condition, or closing the second switch after the initial electric power cycle to bypass the ballast impedance in response to determining that the source-side circuit is not experiencing a fault condition; and if the recloser is performing a circuit opening operation:
determining whether the circuit is experiencing a fault condition based on the current and voltage measurements;
if a fault condition is detected, opening the second switch to initially connect the ballast impedance in series between the source-side circuit and the load-side circuit, and opening the first switch to complete the opening operation after a fault-condition delay;
if a fault condition is not detected, opening the second switch to initially connect the ballast impedance in series between the source-side circuit and the load-side circuit, and opening the first switch to complete the opening operation after a non-fault-condition delay;
wherein the fault-condition delay is less than the initial electric power cycle and the non-fault-condition delay is greater than the initial electric power cycle.

* * * * *